United States Patent [19]
Fekete

[11] Patent Number: 5,961,356
[45] Date of Patent: Oct. 5, 1999

[54] RECEPTACLE APPARATUS FOR ELECTRONIC MODULES

[75] Inventor: Nicholas M. G. Fekete, Richardson, Tex.

[73] Assignee: Dallas Semiconductor Corporation, Dallas, Tex.

[21] Appl. No.: 09/071,571

[22] Filed: May 1, 1998

Related U.S. Application Data

[63] Continuation of application No. 08/577,036, Dec. 22, 1995.
[51] Int. Cl.$^6$ .................................................. H01R 13/24
[52] U.S. Cl. .......................................... 439/700; 439/911
[58] Field of Search ............................ 439/500; 361/728, 361/700, 732, 735, 737, 740, 747, 752, 807, 809, 810, 820, 911

[56] References Cited

U.S. PATENT DOCUMENTS

| | | | |
|---|---|---|---|
| 4,327,953 | 5/1982 | Slagel | 439/331 |
| 4,948,954 | 8/1990 | Dias | 235/441 |
| 5,374,818 | 12/1994 | Bianco et al. | 235/492 |
| 5,493,805 | 2/1996 | Penuela et al. | 40/633 |

Primary Examiner—Neil Abrams
Assistant Examiner—T C Patel
Attorney, Agent, or Firm—Jenkens & Gilchrist P.C.

[57] ABSTRACT

A receptacle apparatus for a compact electronic module for effectuating data communication between the module and an interface circuit. The receptacle apparatus includes a cover arrangement and a combined locking and communication effecting structure. The receptacle apparatus is also designed in various embodiments to be installed on a removeable cover of a system so as not to hamper with removal of that cover.

13 Claims, 7 Drawing Sheets

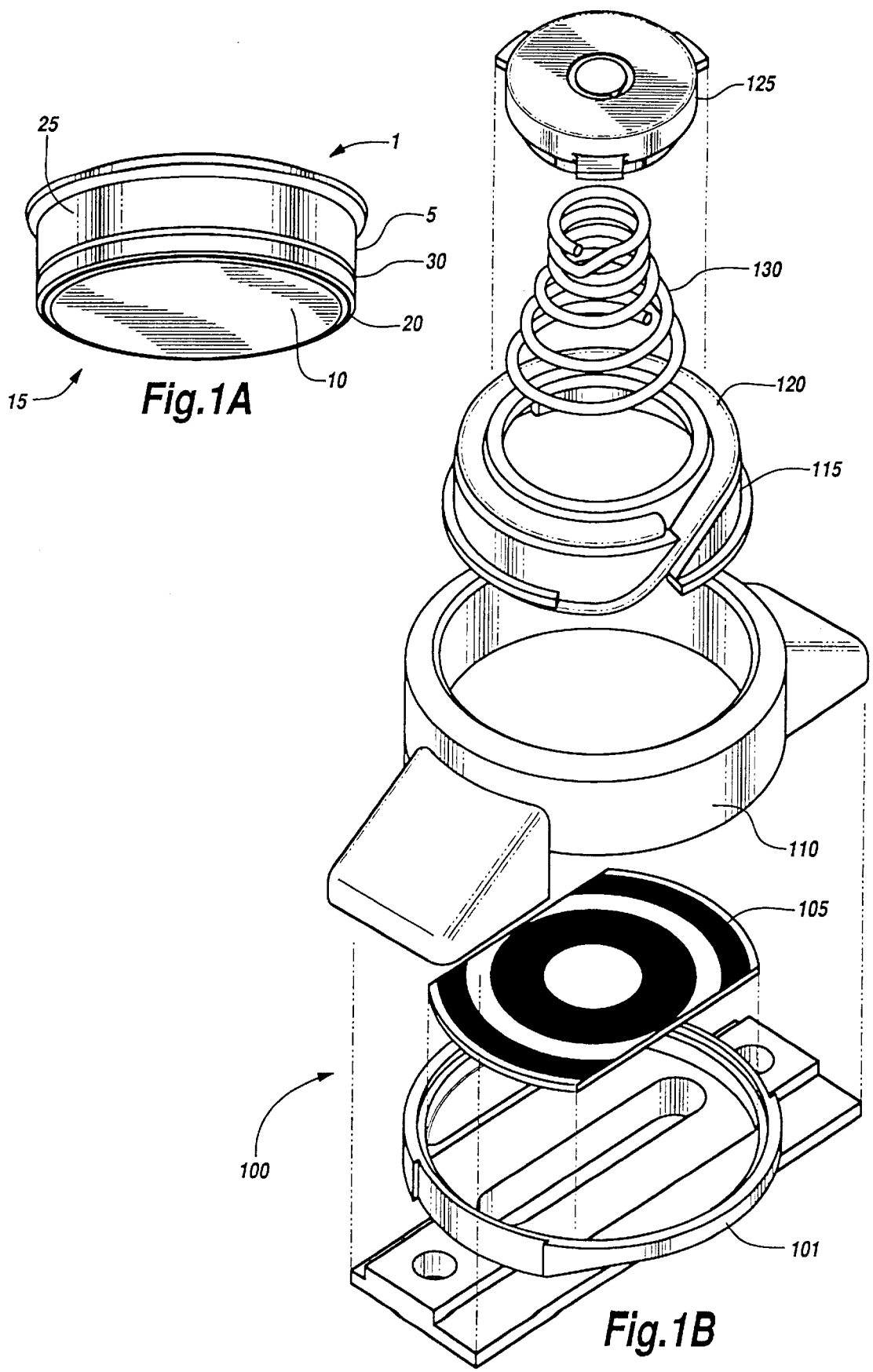

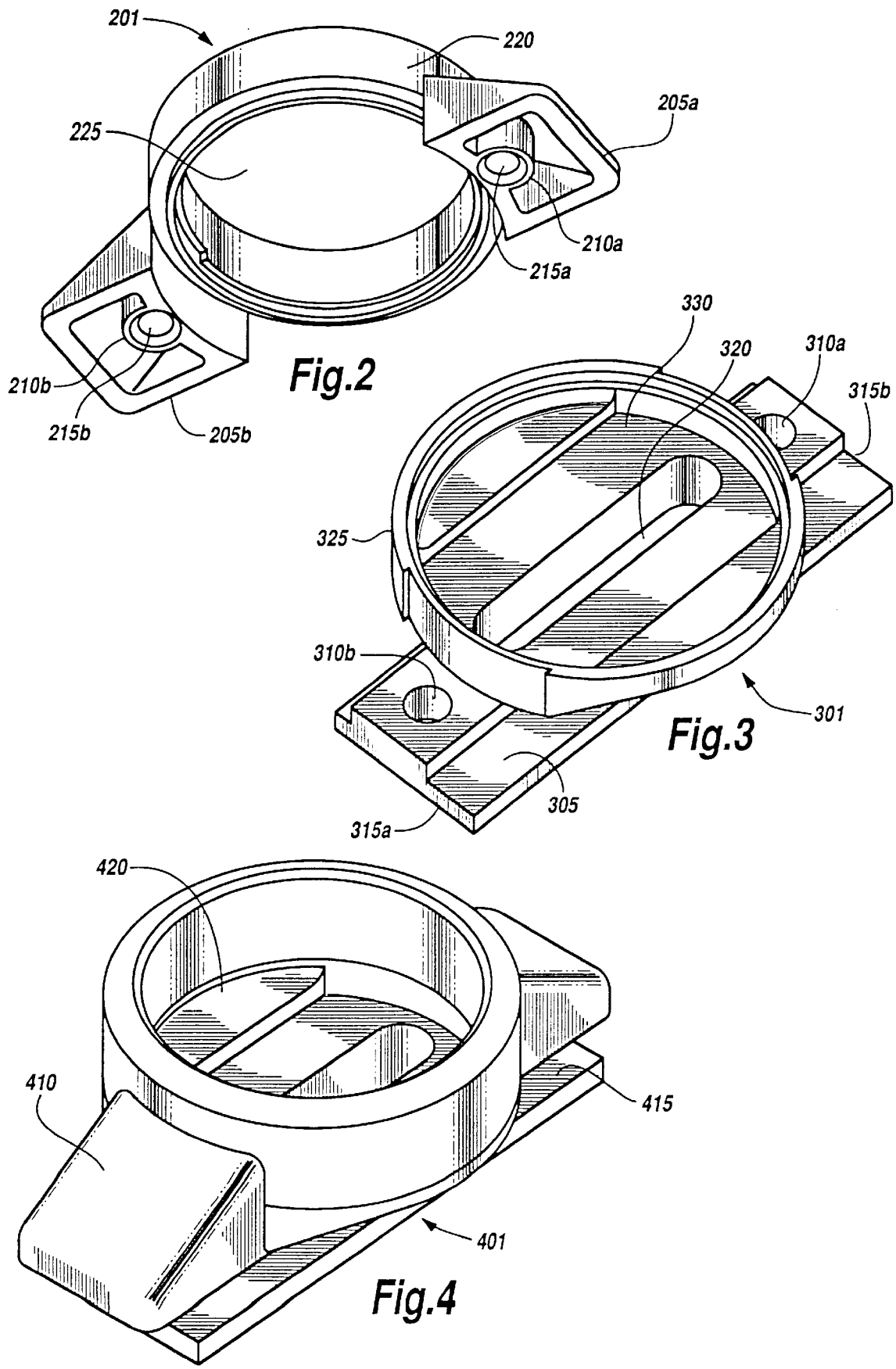

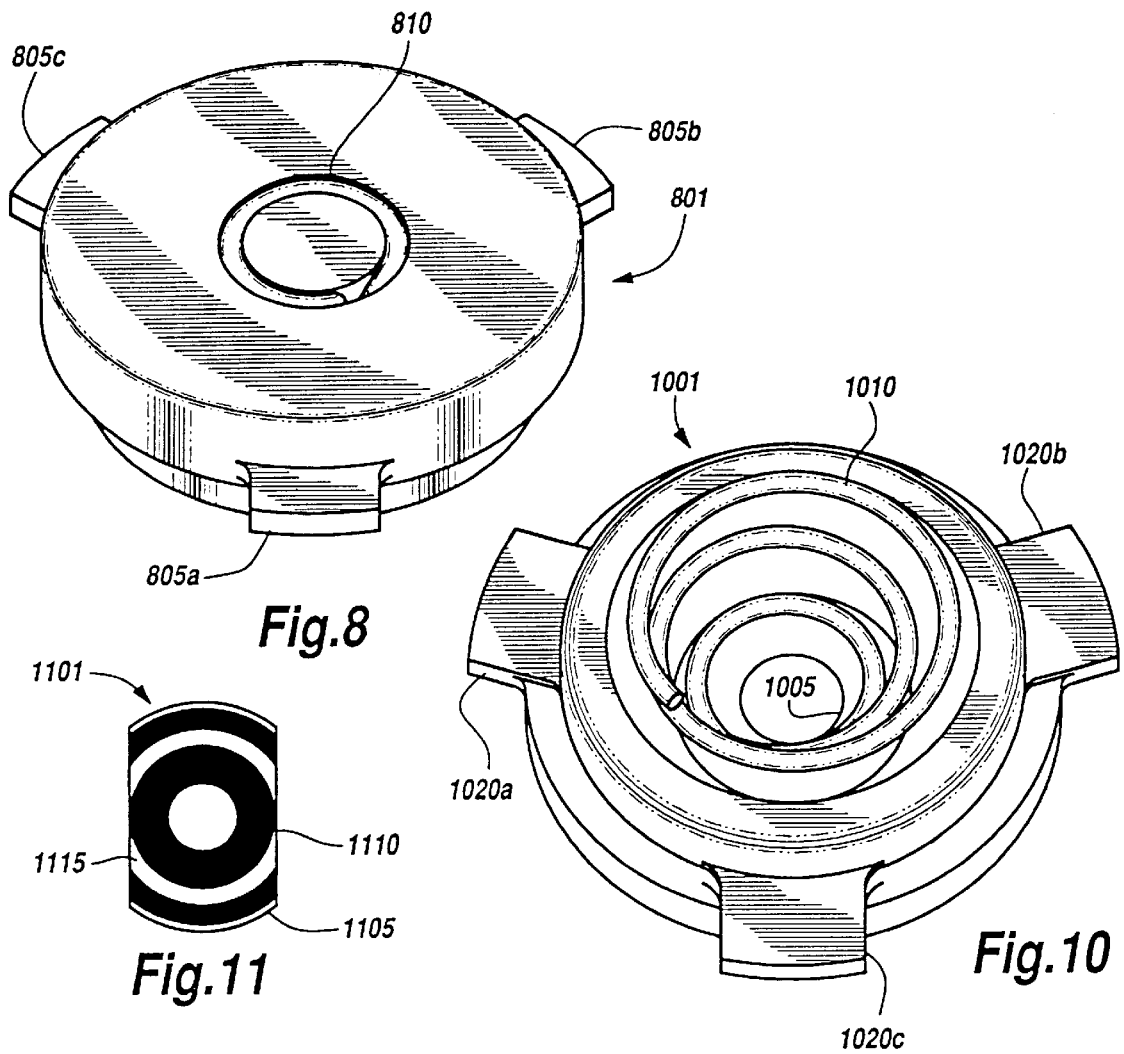
Fig.8
Fig.10
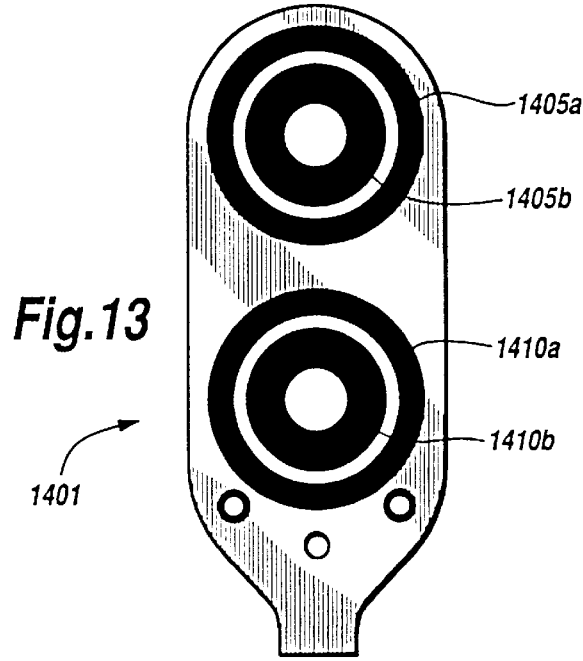
Fig.11
Fig.13

RECEPTACLE APPARATUS FOR ELECTRONIC MODULES

This application is a continuation of application Ser. No. 08/577,036, filed Dec. 22, 1995.

CROSS-REFERENCE TO RELATED APPLICATIONS

This application hereby incorporates by reference the following co-assigned issued patents and patent applications, which describe in great detail the operation of the technology surrounding Touch Memory™ processes and systems, which was developed by employees of Dallas Semiconductor Corporation:

| Patent No. | Filing Date/ Issue Date | Authors |
| --- | --- | --- |
| 4,862,310 | 04-29-88/ 08-29-89 | Harrington |
| 5,210,846 | 05-15-89/ 05-11-93 | Lee |
| 08/019,932 | 02-19-93 | Lee |
| 4,982,371 | 05-15-89/ 01-01-91 | Lee et al. |
| 07/632,227 | 12-20-90 | Lee et al. |
| 5,091,771 | 05-15-89/ 11-18-91 | Bolan et al. |
| 4,972,377 | 05-15-89/ 11-20-90 | Lee |
| 5,191,554 | 08-27-91/ 03-02-93 | Lee |
| 5,181,091 | 09-16-91/ 01-19-93 | Harrington et al. |
| 4,945,217 | 05-15-89/ 07-31-90 | Bolan |
| 5,025,141 | 07-17-90/ 06-18-91 | Bolan |
| 4,948,954 | 05-15-89/ 08-14-90 | Dias |
| 4,983,820 | 08-14-90/ 01-08-91 | Dias |
| 5,045,675 | 05-15-89/ 09-03-91 | Curry |
| 4,995,004 | 05-15-89/ 02-19-91 | Lee |
| 07/657,717 | 02-19-91 | Lee |
| 07/725,793 | 07-09-91 | Curry et al. |
| 07/998,978 | 12-30-92 | Curry et al. |
| 07/527,492 | 05-22-90 | Bolan et al. |
| 5,206,905 | 11-19-90/ 04-27-93 | Lee et al. |
| 07/615,615 | 11-19-90 | Lee et al. |
| 5,226,137 | 11-19-90/ 07-06-93 | Lee et al. |
| 07/882,244 | 05-08-92 | Lee |
| 07/631,929 | 12-19-90 | Curry et al. |
| 07/728,230 | 07-10-91 | Pearson et al. |
| 07/727,618 | 07-10-91 | Williams et al. |
| 07/727,619 | 07-10-91 | Rodriguez et al. |
| 07/727,638 | 07-10-91 | Ni et al. |
| 08/103,724 | 08-09-93 | Pearson et al. |
| 07/727,639 | 07-10-91 | Bolan et al. |
| 5,166,545 | 07-10-91/ 11-24-92 | Harrington |
| 08/022,258 | 02-24-93 | Bolan et al. |
| 08/031,776 | 03-15-93 | Bolan et al. |
| 08/015,506 | 02-09-93 | Harrington et al. |
| 08/234,210 | 04-28-94 | Fekete et al. |
| 29/031,611 | 12-01-94 | Fekete et al. |
| 29/031,610 | 12-01-94 | Fekete et al. |
| 29/031,607 | 12-01-94 | Fekete et al. |
| 29/301,606 | 12-01-94 | Fekete et al. |
| 29/301,823 | 12-01-94 | Fekete et al. |
| 29/031,868 | 12-08-94 | Fekete et al. |
| 29/031,724 | 12-05-94 | Fekete et al. |
| 60/001,303 | 07-20-95 | Bolan et al. |

BACKGROUND OF THE INVENTION

1. Technical Field of the Invention

The present invention relates generally to receptacles for electronic modules. More particularly, the present invention relates to receptacles that facilitate data transfers involving touching, holding, and/or interrogating electronic modules.

2. Description of Related Art

Many modern electronic systems are constructed of modules. Use of modules is widely perceived to simplify and facilitate system construction, improvement, and repair. The electronic modules themselves may be incorporated onto board-like substrates that comprise internal sub-systems of a complex electronic device. Alternatively, the electronic modules may be portable and externally connectable, thereby permitting increased user-selectable functionalities, such as access control, software identification, electronic verification of data transfer, personal data identification and privileged on/off switching of a device.

One of the practical concerns regarding the use of electronic modules is availability of mechanisms adapted for effectuating data transfer between the electronic modules and interface circuits, i.e., circuits for reading from or writing to modules. To address such concerns, Dallas Semiconductor. Corporation ("Dallas Semiconductor"), a corporation organized and existing under the laws of the State of Delaware, and having its principal place of business at 4401 S. Beltwood Parkway, Dallas, Tex., has developed a series of probes and wands that are designed to electrically interact with a series of electronic modules designed and marketed by Dallas Semiconductor under the trademark Touch Memory™. These Touch Memory™ products consist of a semiconductor chip secured within a substantially token-shaped, or button-shaped, stainless steel container. Further details and variations are discussed at length in the related applications, the subject matter of which is incorporated herein.

Although the probes and wands, identified above, are operable for effectuating data transfers not requiring more than 150 milliseconds, they are generally unreliable for data transfers requiring longer time intervals because an electronic module, such as a Touch Memory™ product, is presented to a probe or wand by a human operator for a brief time period only. It is commonly understood in the industry that a more secure arrangement for presenting an electronic module is required for achieving reliable data transfers with longer time intervals. One of the ways by which such a secure arrangement may be realized is by using a receptacle wherein an electronic module may be placed for longer time periods. However, because compact electronic modules are a novel product in and of themselves, there have heretofore been no simple, yet reliable means capable of receiving and removably locking an electronic module into an electrically conductive relationship with an interface circuit.

Yet another concern regarding receptacles is functional attractiveness. For example, it is desirable that receptacles that need to be prominently displayed on consumer electronics be attractive, that is, not simply an unsightly bare hole with visible contacts. It is also desirable that receptacles be "covered" when not in use, to ensure that dust and other debris does not collect within them.

An additional concern that is germane to the use of electronic modules is that if a receptacle is mounted on a removable cover of the housing of a device such that it is hard-wired to an internal interface circuit, the ability to remove the cover is severely limited. This makes it harder for a user to service and replace the inner circuitry of the device. With some devices, such as personal computers, inability to easily remove the cover is a severe shortcoming.

Based upon the foregoing, it should be perceived that there are a number of shortcomings and deficiencies of prior art receptacles. There is no simple, yet reliable and attractive, prior art receptacle capable of securing for extended periods and interacting during such periods with Touch Memory™ or similar products. There is also no wholly unlimiting method for conveniently attaching such a Touch Memory™ receptacle to many devices, such as personal computers having removable covers.

SUMMARY OF THE INVENTION

The present invention overcomes the shortcomings and deficiencies of the prior art by providing a receptacle including a top cover and a bottom cover that are coupled together to provide a first cavity in which a core support assembly is disposed. Also disposed within a chamber formed in the bottom cover is an electrical connection arrangement for providing at least two electrical terminals which comprise at least one ground terminal and at least one data terminal.

In embodiments of the present invention, the core support assembly further comprises a columnar first support comprising an inner surface and an outer surface. The outer surface is designed to provide a support structure for an outer electrical connector. The outer electrical connector is further designed to be in an electrical conductive relationship with at least one ground terminal of the electrical connection arrangement disposed in the bottom cover. The inner surface surrounds a second cavity in which a moveable second support is disposed. The moveable second support is coupled to an inner electrical connector which is in an electrical conductive relationship with at least one data terminal of the electrical connection arrangement disposed in the bottom cover. The movement of the second support within the second cavity is restricted in one direction by an arrangement wherein the inner surface of the first support engages the surface of the second support.

The electrical connection arrangement of the present invention may be made part of the housing of an electronic device which contains an interface circuit. In such a case, easily makeable and breakable contacts can be made between the removable cover and a device chassis to connect the receptacle to the interface circuit. This allows the removable cover to be easily removed from and installed back onto the chassis. This feature facilitates user access within the device without hampering receptacle operation. As long as the removable cover is in place, the receptacle will operate properly.

The electrical connection arrangement of the present invention is also aesthetically pleasing. Presenting a relatively flat second support when not in use, no gaping holes or obviously exposed contacts are present. The flush arrangement of the second support can also keep dust and other debris out of the interior of the receptacle. Moreover, since the electrical connectors are in a constant electrically conductive relationship with the electrical connection arrangement disposed in the bottom cover, any flat object having an embedded data carrier chip may be presented for interrogation to the receptacle by touching alone.

Accordingly, it is an object of the present invention to provide an aesthetically pleasing receptacle apparatus for effectuating interrogation of a compact electronic module that is presented to it by way of touching, inserting, bringing into the vicinity of, or the like, such that the module is placed in an electrically conductive relationship with an interface circuit.

It is a further object of the present invention to provide a receptacle apparatus that is capable of receiving and removably locking a plurality of compact electronic modules.

A still further object of the invention is to provide an arrangement whereby a receptacle apparatus, capable of receiving and removably locking at least one compact electronic module, is mounted on a removable cover of the housing of an electronic device in such a manner that user access to internal portions of the device is not impaired.

BRIEF DESCRIPTION OF THE DRAWINGS

A more complete understanding of the present invention may be had by reference to the following detailed description when taken in conjunction with the accompanying drawings wherein:

FIG. 1a is a perspective view of an electronic module, specifically a Touch Memory™ product manufactured by Dallas Semiconductor Corporation;

FIG. 1b is an exploded, perspective view of an embodiment of a receptacle apparatus according to the teachings of the present invention, which apparatus is adapted to receive a Touch Memory™ or similar module;

FIG. 2 is a perspective view of a top cover of a receptacle apparatus adapted to receive a Touch Memory™ or similar module;

FIG. 3 is a perspective view of a bottom cover of a receptacle apparatus adapted to receive a Touch Memory™ or similar module;

FIG. 4 is a perspective view of an arrangement wherein top and bottom covers are assembled together;

FIG. 8 is a perspective view of a second support to be disposed within a cavity formed by the inner surface of the first support depicted in FIG. 6;

FIG. 10 is a perspective view of a second support with an inner electrical connector disposed therein;

FIG. 11 is a plan view of an embodiment of an electrical connection arrangement for a receptacle apparatus for a Touch Memory™ or similar module;

FIG. 13 depicts an embodiment of an electrical connection arrangement for a receptacle apparatus for receiving two compact Touch Memory™ or similar modules;

DETAILED DESCRIPTION OF A PRESENTLY PREFERRED EXEMPLARY EMBODIMENT

Figure 5:
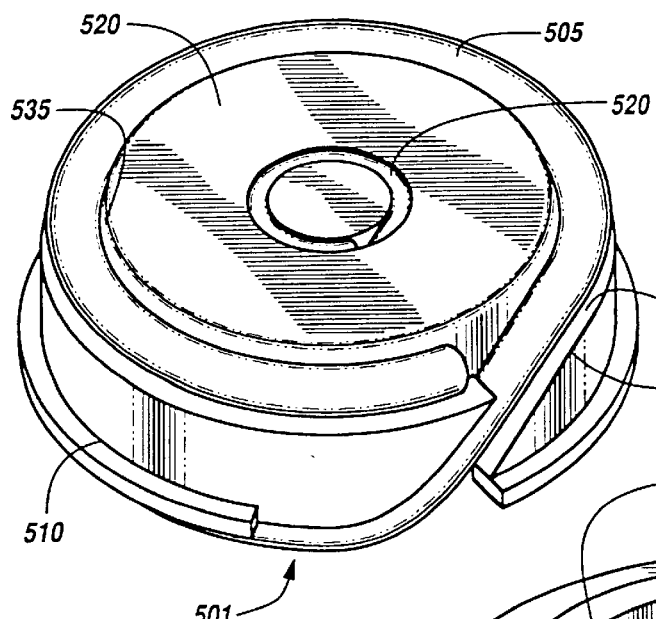
FIG. 5 is a perspective view of a core support assembly.

Referring now to the drawings wherein the elements specified are not necessarily drawn to scale, and more particularly to FIG. 1a, the reference numeral 1 refers to a typical electronic module used in current technologies, such as a Touch Memory™ product created by Dallas Semiconductor Corporation. Although the presently preferred exemplary embodiment of the present invention is designed to interact with a Touch Memory™ product, it can interact with any type of electronic module, even some not yet developed.

The electronic module 1, which may be substantially token-shaped or button-shaped, is designed to house a semiconductor chip (not shown) that may comprise a host of circuit elements such as memory, microprocessors, input/output circuitry, electrostatic discharge protection circuitry and batteries, etc. The housing 15 of the electronic module 1 comprises a male conductive surface 10 and a female conductive surface 5 that are designed so that the male conductive surface 10 is inserted into the female conductive surface 5 which is lined with an insulator 20. The semiconductor chip (not shown) is disposed within a cavity 25 formed by the coupling of the male and female conductive surfaces. The electronic circuitry on the semiconductor chip is designed so that an electrical connection between the female conductive surface 5 of the housing 15 and a ground terminal, and another electrical connection between the male conductive surface 10 and a signal or data terminal of the circuitry, are established. Thus, by placing the male and female conductive surfaces of a module in electrical contact with an interface circuit (not shown), it is possible to access the internal circuit elements of the module for bi-directional data transfer. Depending on the exact nature of the circuit elements present on the semiconductor chip, an electronic module may be used for access control, software identification, electronic verification of data transfer, personal data identification and privileged on/off switching of a device. Further details regarding the Dallas Semiconductor Touch Memory™ products can be found in the related patents and applications listed in the cross-reference section above.

In FIG. 1b, reference numeral 100 refers to an exploded view of an embodiment of a receptacle apparatus adapted to receive and removably lock a Touch Memory™ module. Reference numeral 101 refers to a bottom cover which is coupled to a top cover 110, thereby forming a cavity.

Continuing to refer to FIG. 1b, positioned within the cavity is a circuit board 105 to facilitate an electrical connection arrangement between the Touch Memory™ module and an interface circuit (not shown). Also positioned within the cavity is a first support 115 having an outer electrical connector 120. Disposed within a second cavity formed by the first support 115 is a second support 125 to which is coupled an inner electrical connector 130. Detailed description of these various constituent parts is provided below with reference to individual drawings.

In FIG. 2, there is shown a top cover, labeled 201, of an embodiment of a receptacle apparatus. This cover corresponds to cover 110 depicted in FIG. 1b. Reference numerals 205a and 205b refer to a pair of male shoulders that project from a circular body 220. Each shoulder is designed to contain a post 210a or 210b, used for coupling with a bottom cover, discussed immediately below.

Referring now to FIG. 3, there is shown the bottom cover, labeled 301, mentioned above. This cover corresponds to cover 101 depicted in FIG. 1b. Reference numeral 305 refers to a rectangular base to which a circular platform 325 is coupled. It is understood that the rectangular base 305 and the circular platform 325 may be formed together as a single piece. The rectangular base 305 has a pair of holes 310a and 310b in its female shoulders 315a and 315b, that are designed for facilitating coupling with the posts in the top cover 201.

The circular platform 325 has a planar depression 330 in which a printed circuit board (not shown), or the like, may be disposed. The bottom cover 301 has an aperture 320 through the circular platform 325 and the rectangular base 305, which may be used for facilitating access to electrical connectors from an interface circuit.

FIG. 4 shows an exemplary embodiment wherein both top and bottom covers are assembled together. In this FIG., reference numerals 410 and 415 refer to the top cover and bottom cover, respectively. The top cover 410 is coupled to the bottom cover 415 such that a cavity 420 is formed thereby. Although the preferred embodiment discloses the cavity 420 formed by the coupling of the top cover 410 and the bottom cover 415, it should be well understood by those skilled in the art that a cover having a cavity may be produced in numerous ways. For example, such a cover may be produced by single piece injection molding, or by a piece having two equal halves, or by a pressed assembly of multiple parts. Therefore, the instant description of the preferred embodiment should be construed as encompassing all variations and modifications known to persons of ordinary skill in the art, including, but not limited to, those mentioned above. Further, the cross-section of the cavity thus formed may take different shapes, including, but not limited to, circular, hexagonal, octagonal, rectangular, triangular, or any other polygonal variations known in the art.

Referring now to FIG. 5, there is shown a core support assembly, labeled 501, which comprises a first support 510 having a helical groove 515 and a second support 520 disposed within a cavity 535 formed by the first support 510. An outer electrical connector 505 is disposed within the helical groove 515. A top end 525 of an inner electrical connector (best seen in FIG. 9) is coupled to the second support such that it is disposed within the cavity 535.

Figure 6:
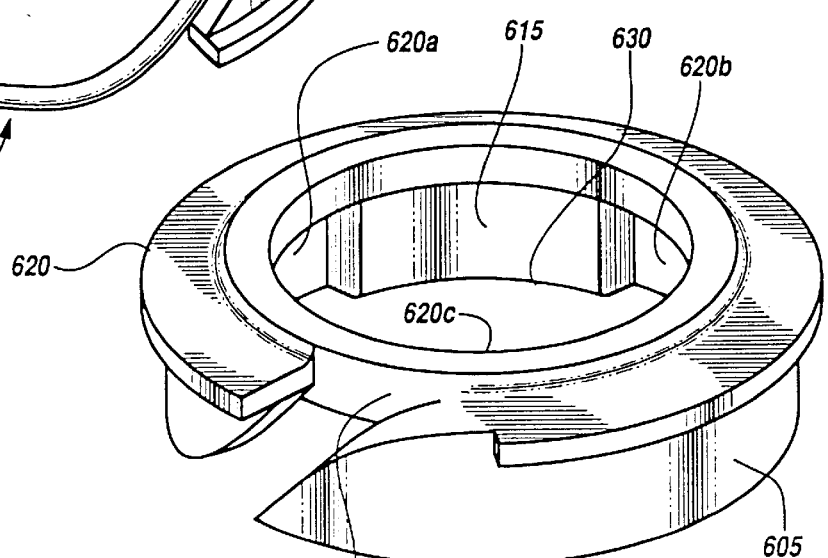
FIG. 6 is a perspective view of a first support to be disposed in a cavity formed by the coupling of top and bottom covers.

Referring now to FIG. 6, reference numeral 601 refers to a first support (corresponding to element 510 in FIG. 5) having a second cavity 630. An outer surface 605 of the first support 601 is shaped to have a helical groove 610 wherein an outer electrical connector (not shown in this FIG.) may be disposed. An inner surface 615 of the first support 601 contains preferably a plurality of slots 620a, 620b, and 620c. The slots are designed such that they do not extend fully along the height of the inner surface 615.

Figure 7:
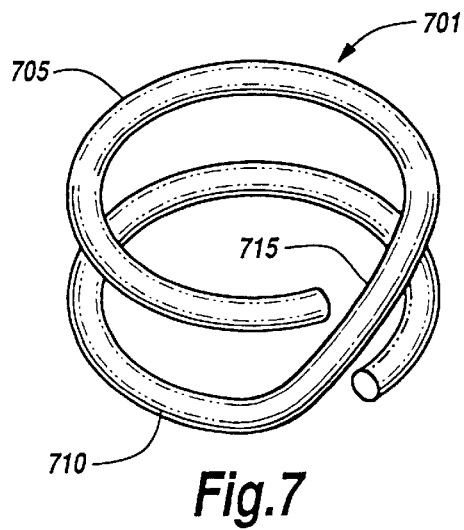
FIG. 7 is a perspective drawing of an outer electrical connector designed to be disposed on the outer surface of the first support depicted in FIG. 6.

FIG. 7 illustrates an outer electrical connector 701 (corresponding to element 505 in FIG. 5) having a bottom coil 710 and a top coil 705. The outer electrical connector is designed so that it is capable of being disposed within the helical groove 610 shown in FIG. 6. Any electrically conductive material having elastic properties may be fashioned to function as the outer electrical connector 701 in an embodiment of the present invention.

Referring now to FIG. 8, reference numeral 801 refers to a second support (corresponding to element 520 in FIG. 5) having preferably a plurality of radial extensions 805a, 805b, and 805c, and a helical channel 810. The radial extensions 805a, 805b, and 805c are dimensioned so as to be capable of being positioned in the slots (reference numerals 620a, 620b and 620c of FIG. 6) of the inner surface (reference numeral 615 of FIG. 6) of the first support (reference numeral 601 in FIG. 6). The helical channel 810 is capable of receiving a top end of an inner electrical connector (not shown in this FIG.). The mechanical engagement of the slots 620a, 620b and 620c with the radial extensions 805a, 805b and 805c is designed to restrict the movement of the second support 801 inside the second cavity formed by the first support (not shown in this FIG.). Although the preferred embodiment for accomplishing this restriction in movement has been described with reference to a plurality of inter-locking slots and projections, this description is not meant to be limiting. For example, the restrictive engagement can also be accomplished by coupling of inter-locking lips disposed on first and second supports. Other methods for accomplishing restriction in movement could also be employed in embodiments of the present invention.

Figure 9:
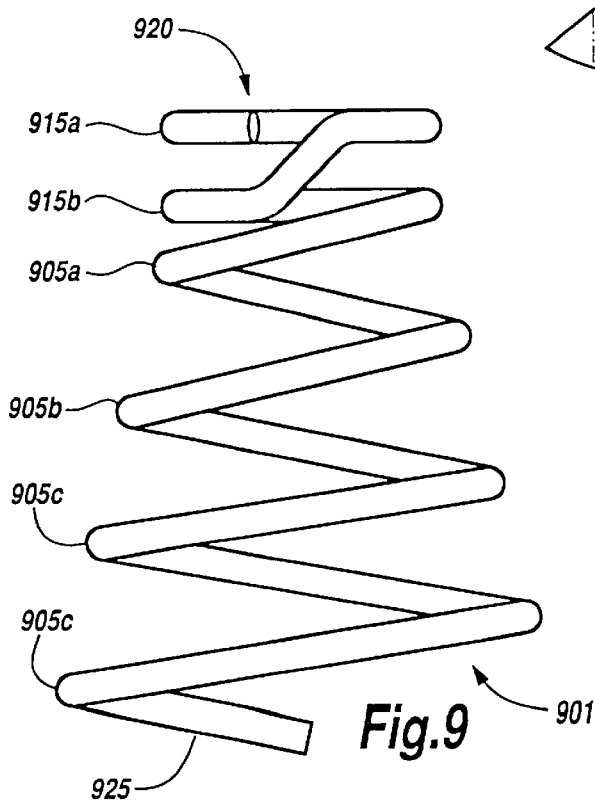
FIG. 9 is a view of an inner electrical connector designed to be coupled to the second support depicted in FIG. 8.

In FIG. 9, reference numeral 901 refers to an inner electrical connector 901 (corresponding to the element the top end of which, labeled 525, is shown in FIG. 5) having a top end 920 and a bottom end 925. The top end 920 comprises a first support coil 915a and a second support coil 915b. A plurality of working coils 905a, 905b, 905c, and 905d comprise the bottom end 925. The top end 920 is dimensioned so as to be capable of being positioned in the helical channel (reference numeral 810 in FIG. 8) of the second support (reference numeral 801 in FIG. 8). This description is not meant to be construed in a limiting sense. Various modifications of the preferred embodiment of an inner electrical connector will readily occur to persons skilled in the art. For example, any electrically conductive material having elastic properties may be fashioned to function as the inner electrical connector 901. The appended claims have been drafted with a view towards encompassing all such modifications and variations.

FIG. 10 illustrates a second support 1001 to which an inner electrical connector 1010 is coupled such that its top end (reference numeral 920 in FIG. 9) is disposed within a helical channel 1005. Stated another way, FIG. 10 is an upward-looking-from-the-bottom view of elements such as those depicted in FIGS. 8 and 9.

FIG. 11 illustrates an embodiment of an electrical connection arrangement used in a single receptacle apparatus. Reference numeral 1101 refers to a printed circuit board having a ground pad 1105 and a data pad 1110. An outer electrical connector (not shown) is designed to be in an electrically conductive relationship with the ground pad 1105. An inner electrical connector (not shown) is designed to be in an electrically conductive relationship with the data pad 1110. Corresponding to the structural variations and modifications relative to a core support assembly and the outer and inner electrical connectors discussed hereinabove, there are modifications of the preferred embodiment of electrical connection arrangement used in a receptacle apparatus for a single electrical module that will become apparent to those skilled in the art upon reference hereto.

In conjunction with the foregoing detailed description of the drawings, it is now possible to describe the operation of a presently preferred exemplary embodiment of the present invention. Before a Touch Memory™ or similar module (reference numeral 1 in FIG. 1a) is presented to a receptacle apparatus, a second support (reference numeral 801 in FIG. 8) is substantially co-planar with a top coil (reference numeral 705 in FIG. 7) of an outer electrical connector (reference numeral 701 in FIG. 7) which is biased against a ground pad (reference numeral 1105 in FIG. 11) of a printed circuit board (reference numeral 1101 in FIG. 11). An inner electrical connector (reference numeral 901 in FIG. 9), which is coupled to the second support 801 at its top end (reference numeral 920 in FIG. 9), is biased at its bottom end (reference numeral 925 in FIG. 9) against a signal pad (reference numeral 1110 in FIG. 11) of the printed circuit board 1101. The second support 801 is engaged within the first support 601 by means of a plurality of inter-locking slots (reference numerals 620a, 620b and 620c in FIG. 6) and radial extensions (reference numerals 805a, 805b and 805c in FIG. 8).

Presentation of the Touch Memory™ or similar module 1 preferably involves placing it on the second support 801 so that a male conductive surface (reference numeral 10 in FIG. 1a) of the module 1 is in contact with the top coil 920 of the inner electrical connector 901. Then, by depressing the second support 801 with the electrical module 1, the inner electrical connector 901 gets compressed so that the electronic module 1 may be positioned inside a space formed thereby. Because of this depression, the top coil 705 of the outer electrical connector 701 is placed in a groove (reference numeral 30 in FIG. 1a) of the Touch Memory™ or similar module 1. This placement thus provides both mechanical locking as well as electrical connection between the outer electrical connector 701 and a female conductive surface (reference numeral 5 in FIG. 1a) of the module 1.

Figure 12:
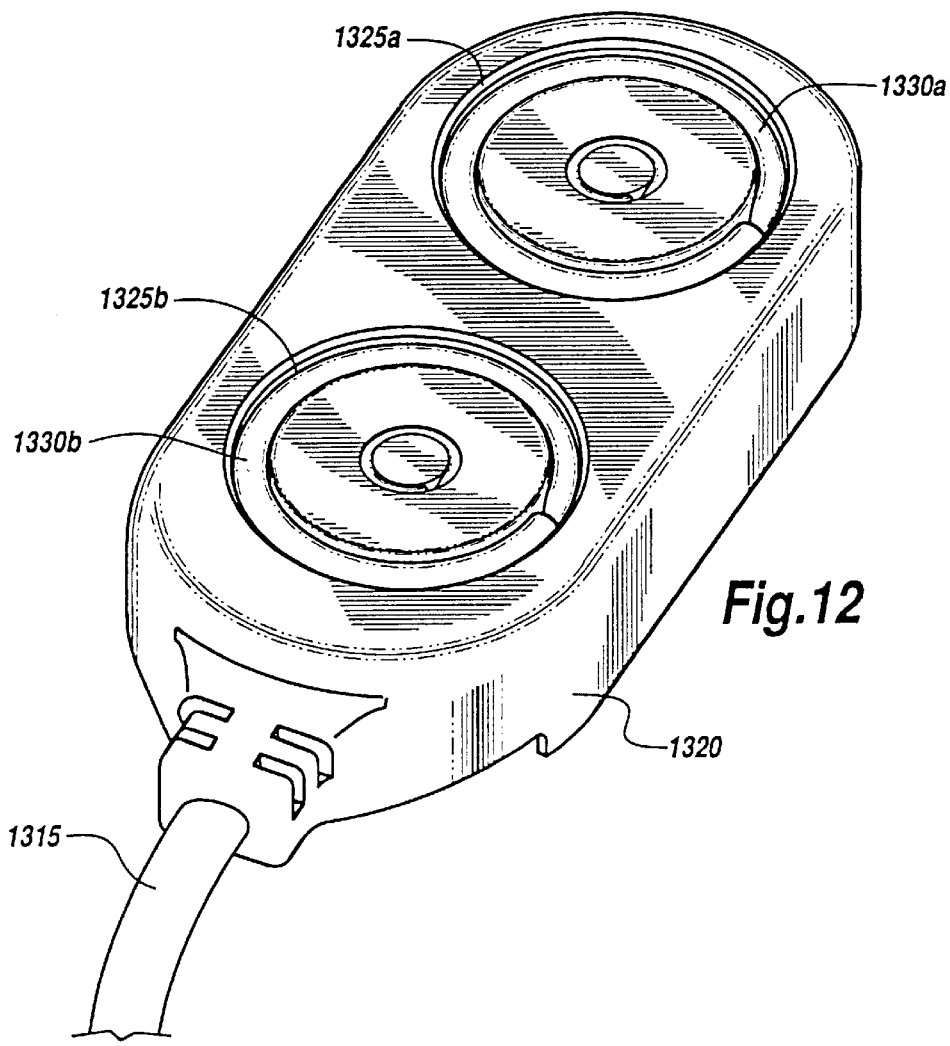
FIG. 12 is a perspective view of an embodiment of a receptacle apparatus for receiving two compact Touch Memory™ or similar modules.

FIG. 12 illustrates another exemplary embodiment of the present invention wherein a receptacle housing 1320 is designed to receive two Touch Memory™ or similar modules (not shown) for data communication with an interface circuit (not shown) via a connector 1315. The receptacle housing 1320 is designed to have two cavities 1325a and 1325b such that a core support assembly 1330a or 1330b may be disposed in each cavity.

In FIG. 13, reference numeral 1401 refers to an embodiment of an electrical connection arrangement used in a receptacle apparatus for two Touch Memory™ or similar modules. The printed circuit board 1401 has two pairs of concentric pads 1405a; 1405b and 1410a; 1410b. The first pair has two electrical pads, a ground pad 1405a and a data pad 1405b, and is designed to electrically engage a first core support assembly (not shown). The second pair has two electrical pads, a ground pad 1410a and a data pad 1410b, that electrically engage a second core assembly (not shown). Once again, corresponding to the structural variations and modifications relative to a core support assembly and the outer and inner electrical connectors discussed hereinabove, there are modifications of the preferred embodiment of electrical connection arrangement used in a receptacle apparatus for two electrical modules that will become apparent to those skilled in the art upon reference hereto.

Figure 14:
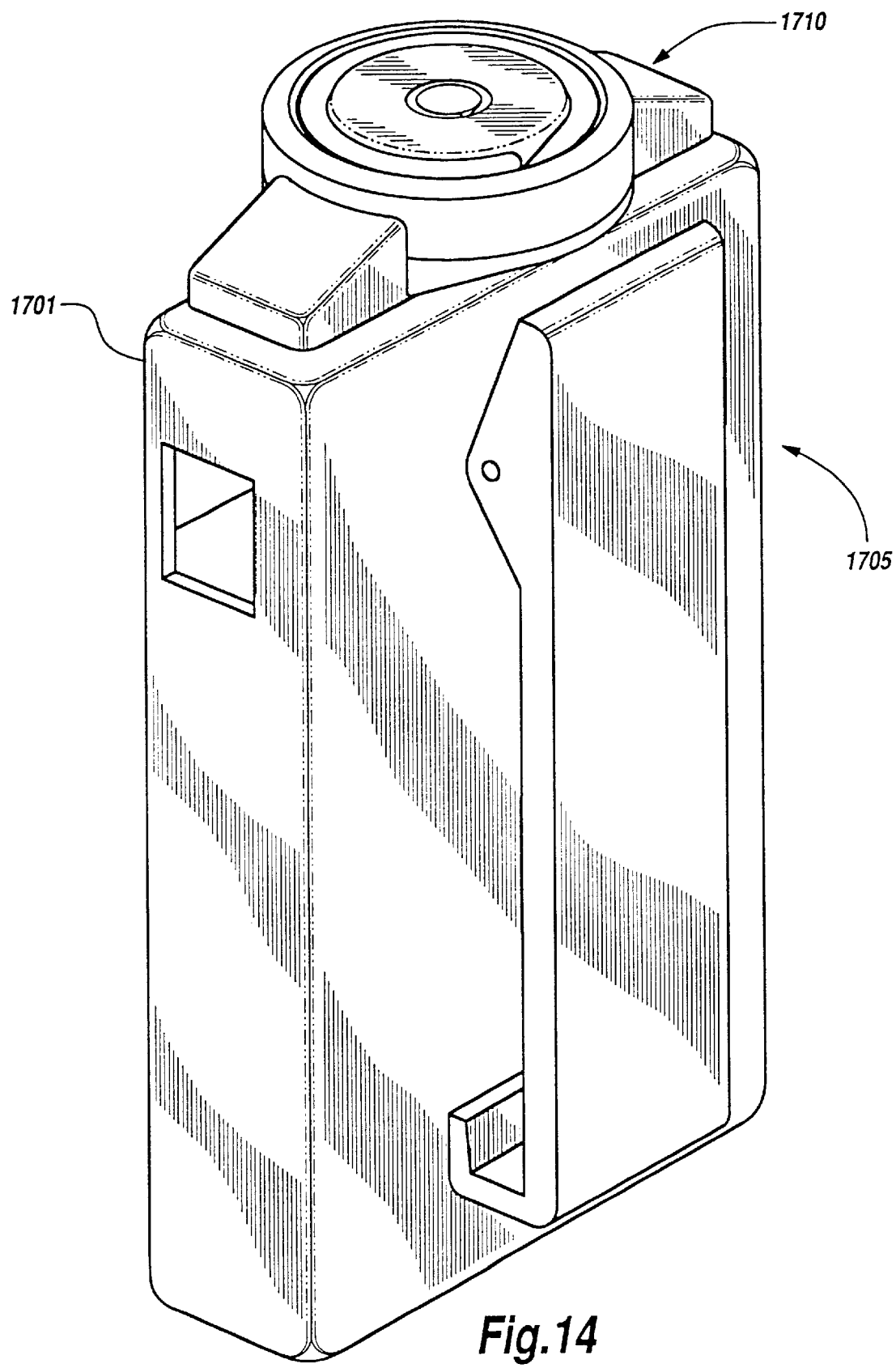
FIG. 14 is a perspective view of a receptacle apparatus mounted on an electronic data device.

FIG. 14 illustrates the application of a receptacle apparatus 1710 on an electronic data device 1705. It is envisaged that the electronic data device 1705 is capable of receiving, transmitting and manipulating electronic data or information. The housing 1701 of the electronic data device 1705 surrounds the rectangular base (reference numeral 305 in FIG. 3) of the bottom cover (reference numeral 301 in FIG. 3) of the receptacle apparatus 1710.

Figure 15A:
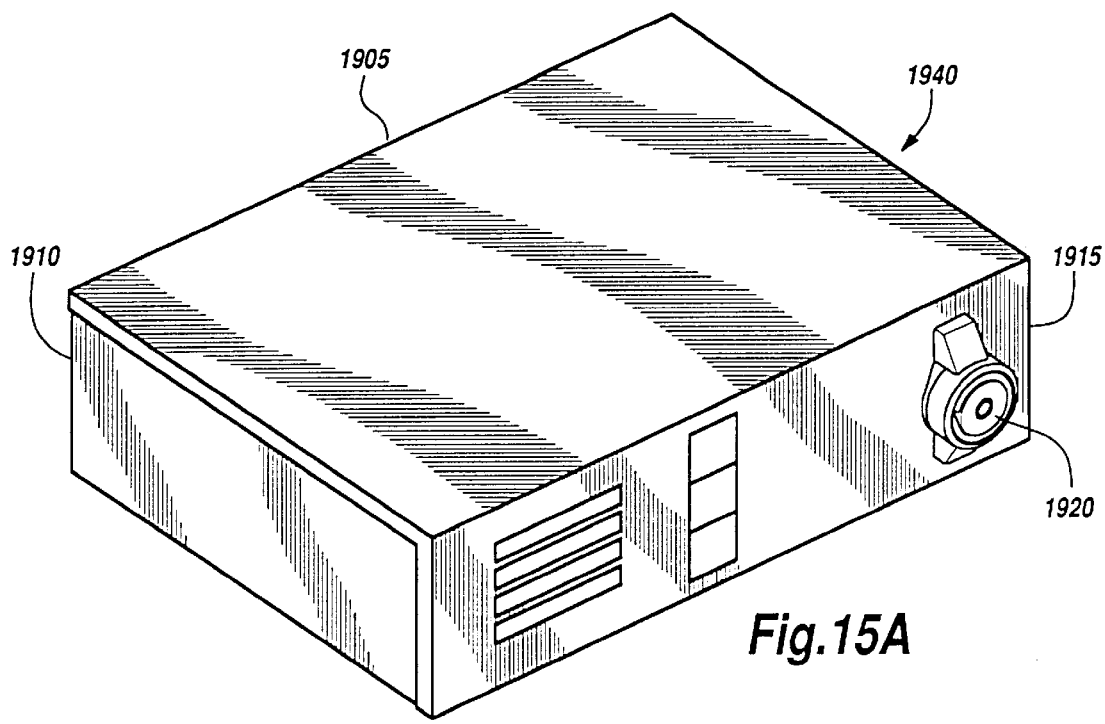
FIG. 15a is a perspective view of a receptacle apparatus mounted on the removable front cover of a computer.
Figure 15B:
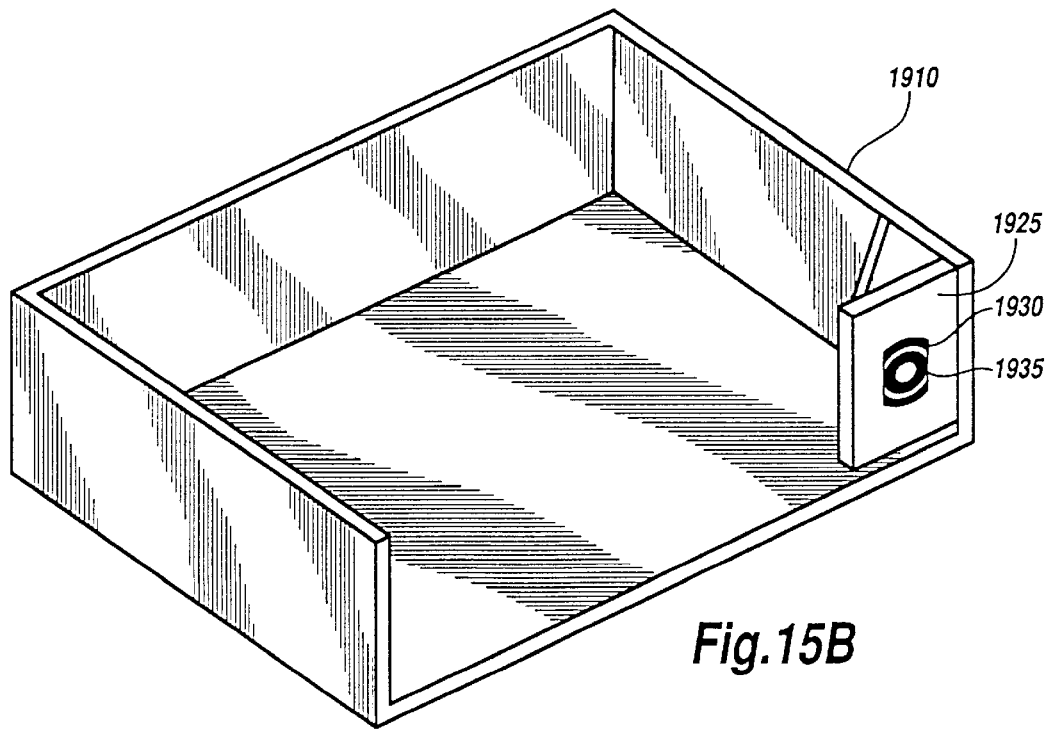
FIG. 15b is a perspective view of a chassis of a computer housing with its front cover removed.

Referring now to FIG. 15a, reference numeral 1905 refers to a housing of a computer 1940. The housing 1905 comprises a chassis 1910 and a removable front cover 1915. Mounted on the removable front cover 1915 is a receptacle apparatus 1920 for a single Touch Memory™ or similar module (not shown). In FIG. 15b, the chassis 1910 contains a printed circuit board 1925 with a ground pad 1930 and a data pad 1935. When the removable cover 1915 (in FIG. 15a) is in its place over the chassis 1910, the outer electrical connector (not shown in this FIG.) and the inner electrical connector (also not shown in this FIG.) of a core support assembly (also not shown in this FIG.) make contact with the ground pad 1930 and the data pad 1935, respectively.

Figure 16:
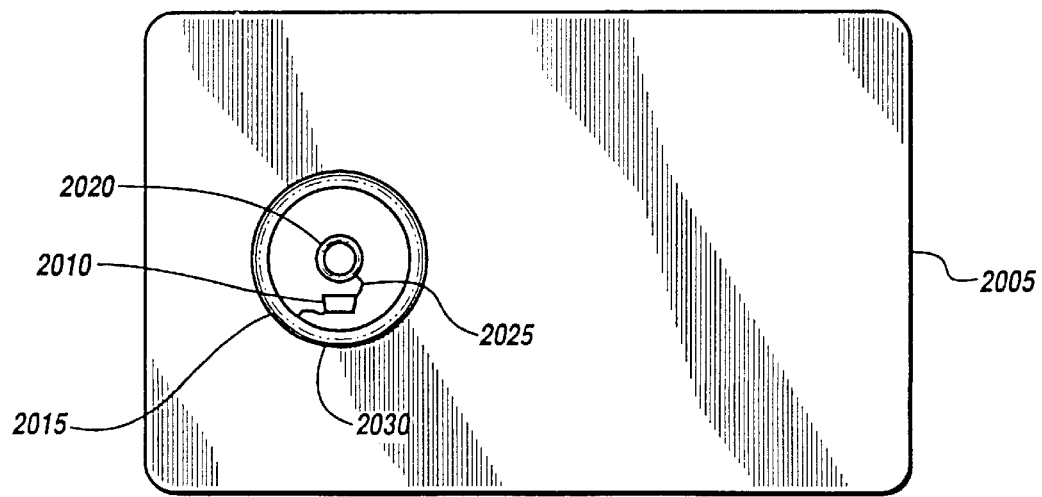
FIG. 16 is a sketch of a flat object having an embedded electronic data carrier that may be presented to a receptacle apparatus.

FIG. 16 depicts yet another novel application of the innovative concepts underlying the present invention. Since both an inner electrical connector (reference numeral 901 in FIG. 9) and an outer electrical connector (reference numeral 701 in FIG. 7) are in a constant electrically conductive relationship with a signal pad (reference numeral 1110 in FIG. 11) and a ground pad (reference numeral 1105 in FIG. 11), a flat object 2005 (for example, a transaction card) having an electronic data carrier 2010 embedded therein can also be presented for interrogation to a receptacle apparatus (not shown in this FIG.) without having to depress a second support (reference numeral 125 in FIG. 1b). This novel application of the present invention as a "front end" of a read/write interface unit is possible because the embedded electronic data carrier 2010 can be designed so that it can receive or transmit electronic data on a bus having a signal path 2025 and a ground path 2030, which paths may be electrically connected to embedded concentric terminals 2020 and 2015, respectively. Data transfer is effectuated by simply aligning the flat object 2005 in a read/write unit such that the concentric terminals 2020 and 2015 are in contact with a top end (reference numeral 920 in FIG. 9) of the inner electrical connector 901 and a top coil (reference numeral 705 in FIG. 7) of the outer electrical connector 701, respectively of the receptacle apparatus. It can be readily seen that potential for useful variations of this novel application is virtually unlimited. Conceivably, every transaction that involves presentation of a flat object for interrogation can be amenable to this application or an obvious variation thereof.

Based upon the foregoing, those skilled in the art should now fully understand and appreciate that the present invention provides a receptacle especially well suited to interact with a Dallas Semiconductor Touch Memory™ module in a personal computer environment. The provided receptacle can easily touch, hold, and interrogate a Touch Memory™ or similar module for effectuating data transfers requiring a broad range of time intervals. Further, the receptacle apparatus of the present invention can receive and removably lock a Touch Memory™ module presented to it by a human operator in a secure mechanical arrangement, thereby providing physical support as well as effectuating an electrically conductive relationship with an interface circuit. Since a Touch Memory™ module is removably lockable in the receptacle apparatus, multiple modules may be sequentially be used, in a pre-determined sequence if need be, to achieve specific functionalities. For example, for an electronic verification of intelligent data transfer that may require two separate authentications, respective holders of the pre-approved modules may present their modules in a pre-determined sequence.

In addition, the present invention provides an aesthetically pleasing receptacle apparatus that is mountable on housings of various consumer electronics devices without detracting their appearance. Instead of having unsightly holes or recesses that may be capable of receiving a Touch Memory™ or similar module, the present invention provides an attractive structure that is simple yet reliable, and which may be applied unobtrusively to a vast variety of housings. Moreover, the receptacle apparatus of the present invention is designed in such a way that when a Touch Memory™ or similar module is not inserted therein, there is no cavity-forming recess because the second support is biased against, and thereby flush with, the first support. The second support forms a "cover," if you will, for the "housing" formed by the top and bottom covers. Since there is no cavity or recess when not in use, the problem of collecting dust or other debris is obviated. Also, to the extent that it is preferably mounted on vertical surfaces of housings, there is very little likelihood of accidentally short-circuiting the pads of the receptacle apparatus.

An especially advantageous aspect of the present invention is that it can be installed on a housing with a removable cover, or bezel, in a simple, yet efficient manner. There are various techniques currently available for mounting a receptacle on a housing of a device that contains an interface circuit. For example, it is known to those skilled in the art that the electrical connection arrangement between an interface circuit and the receptacle apparatus may often take a fly-wire arrangement wherein a tether is used between the interface circuit and the receptacle mounted on the cover. However, such fly-wire arrangements enable only partial removal of the cover without severing the tethering. Further, such partial removal is both cumbersome and restrictive. It can be readily appreciated by those skilled in the art that the present invention overcomes all these problems in a simple, yet elegant, way.

Although a preferred embodiment of the apparatus of the present invention has been illustrated in the accompanying drawings and described in the foregoing detailed description, it will be understood that the present invention is not limited to the embodiment disclosed, but is capable of numerous rearrangements, modifications and substitutions without departing from the spirit of the invention as set forth and defined only by the appended claims.

Furthermore, the application examples discussed herein are not intended to be exhaustive, rather illustrative only. These examples help show the scope of the inventive concepts which are covered in the claims appended below. The appended claims are intended to cover these examples and alternate embodiments as well as a host of applications of this technology. For example, the receptacle apparatus shown in the accompanying drawings can be used in access control, software authorization, personal data carriers, electronic verification, privileged switching, as well as a host of additional applications.

What is claimed is:

1. A system accessible with a data carrier for carrying data, comprising:
   a device with a housing, access to said device is effectuated by data in the data carrier, said device including a read/write interface unit associated with a transaction terminal; and
   a receptacle for receiving the data carrier, said receptacle comprising:
   at least one cover element forming a cavity;
   support means disposed in said cavity, wherein a spring combination including a ground spring and a data spring is held in place by said support means;
   a substrate with a ground pad and a data pad, said ground spring urged against said ground pad and said data spring urged against said data pad for forming an electrical relationship with said data carrier when said data carrier is presented to said receptacle, wherein said receptacle is attached to said housing of said device.

2. The system as set forth in claim 1, wherein said device comprises a portable computer.

3. The system as set forth in claim 1, wherein said device comprises a pager.

4. The system as set forth in claim 1, wherein said device comprises a radio transceiver unit.

5. The system as set forth in claim 1, wherein said device comprises a mobile cellular phone unit.

6. The system as set forth in claim 1, wherein said support means comprises a substantially cylindrical structure with a channel therein, said substantially cylindrical structure disposed in said cavity formed by said at least one cover element, and a movable column with projection means disposed in said channel, said projection means urged against one or more slots formed in said channel.

7. A transaction system, comprising:
- a read/write interface unit for receiving a transaction card, said transaction card having a data carrier for storing data, and at least one ground terminal and at least one data terminal, each of which is coupled to said data carrier; and
- a receptacle for engaging said transaction card, comprising:
  - at least one cover element forming a cavity;
  - support means disposed in said cavity, wherein a spring combination including a ground spring and a data spring is held in place by said support means;
  - means for establishing an electrical communication relationship between said read/write interface unit and said spring combination when said transaction card is presented to said receptacle,
  - wherein said receptacle is attached to a housing of said read/write interface unit.

8. The transaction system as set forth in claim 7, wherein said support means comprises a substantially cylindrical structure with a channel therein, said substantially cylindrical structure disposed in said cavity formed by said at least one cover element, and a movable column with projection means disposed in said channel, said projection means urged against one or more slots formed in said channel.

9. A system accessible with a data carrier for carrying data, comprising:
- a device with a housing, access to said device being effectuated by data in the data carrier; and
- a receptacle for receiving the data carrier, said receptacle comprising:
  - at least one cover element forming a cavity;
  - support means disposed in said cavity, wherein a spring combination including a ground spring and a data spring is held in place by said support means;
  - said support means includes a substantially cylindrical structure with a channel therein, said substantially cylindrical structure disposed in said cavity formed by said at least one cover element, and a movable column with projection means disposed in said channel, said projection means urged against one or more slots formed in said channel;
  - a substrate with a ground pad and a data pad, said ground spring urged against said ground pad and said data spring urged against said data pad for forming an electrical relationship with said data carrier when said data carrier is presented to said receptacle,
  - wherein said receptacle is attached to said housing of said device.

10. The system as set forth in claim 9, wherein said device comprises a portable computer.

11. The system as set forth in claim 9, wherein said device comprises a pager.

12. The system as set forth in claim 9, wherein said device comprises a radio transceiver unit.

13. The system as set forth in claim 9, wherein said device comprises a mobile cellular phone unit.

* * * * *